Dec. 1, 1936.                E. W. DAVIS                2,062,447
                        LUBRICATING APPARATUS
                Original Filed Aug. 26, 1933    2 Sheets-Sheet 1
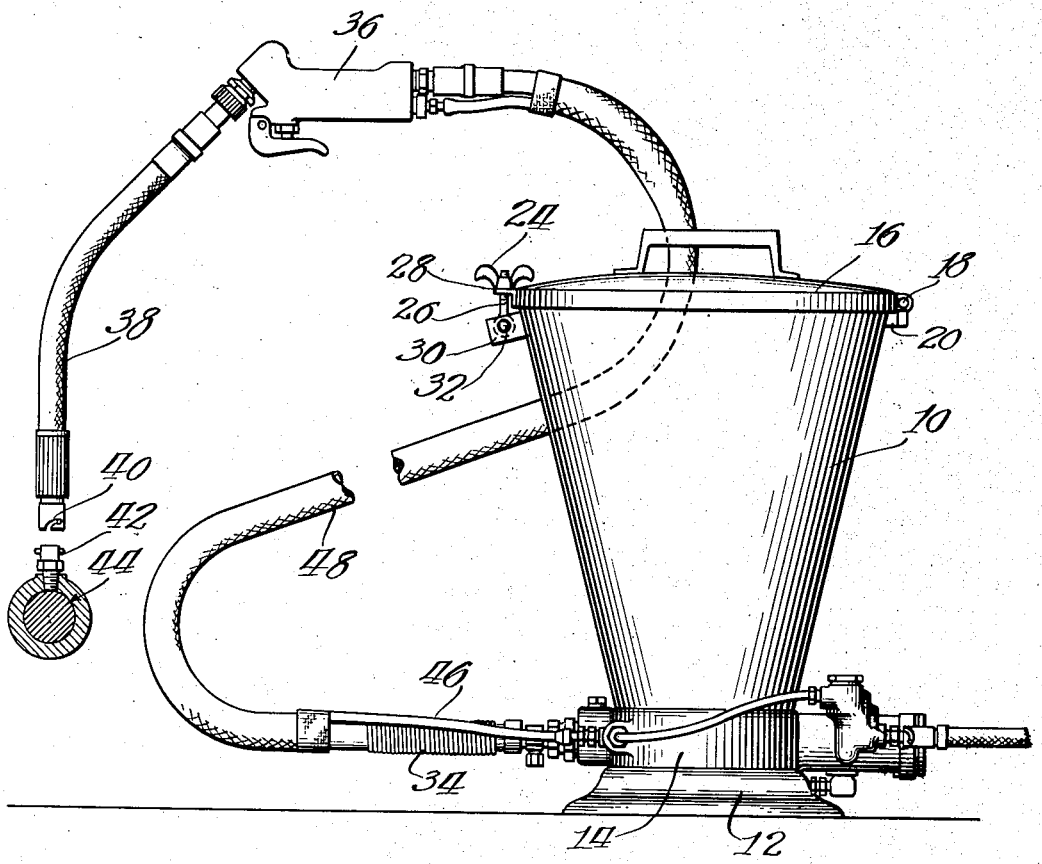
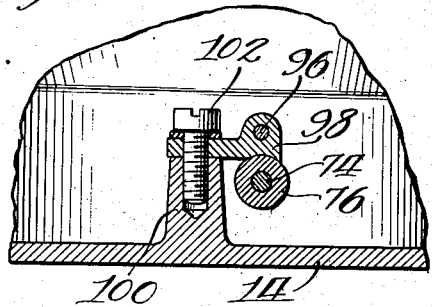
Inventor:
Ernest W. Davis
By Williams, Bradbury, McCaleb
    & Hinkle.
              Attys.

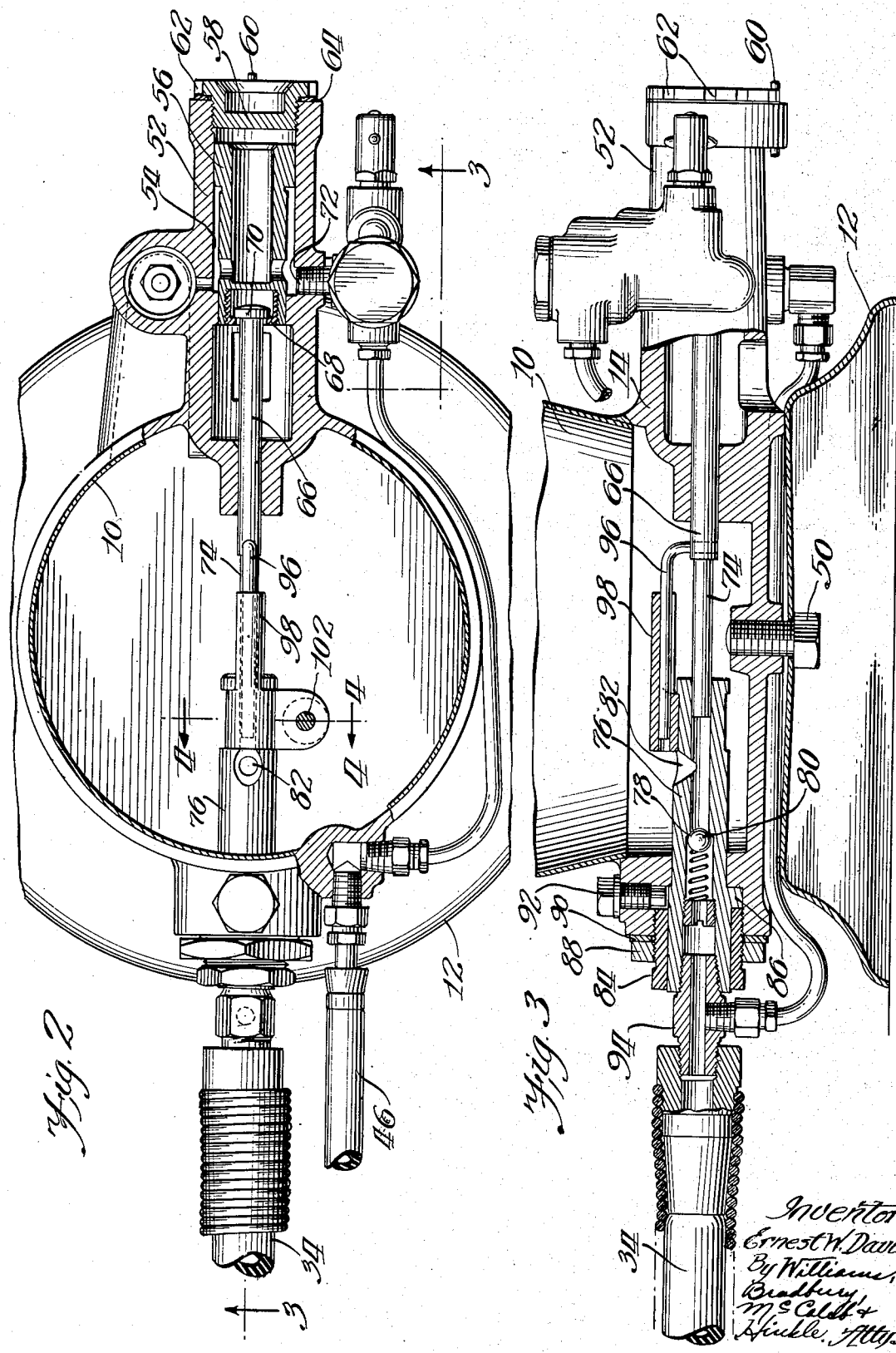

Patented Dec. 1, 1936

2,062,447

UNITED STATES PATENT OFFICE 2,062,447

LUBRICATING APPARATUS

Ernest W. Davis, Oak Park, Ill., assignor, by mesne assignments, to Stewart-Warner Corporation, Chicago, Ill., a corporation of Virginia Original application August 26, 1933, Serial No. 686,928. Divided and this application April 4, 1936, Serial No. 72,739

5 Claims. (Cl. 221—47.1)

My invention relates generally to lubricating apparatus, and more particularly to pneumatically operated high pressure lubricant compressors.

Difficulty is frequently experienced in causing lubricant to feed properly into the cylinders of high pressure lubricating equipment, primarily due to the presence of pockets of air in the lubricant. The cylinder and plunger of the lubricant compressor are not designed to discharge air, and air present in the cylinder may be merely compressed upon the discharge stroke of the plunger and again expand on the suction stroke, thus rendering the compressor operation effective. If, however, the pockets of air are broken up so that the air is present in the grease only in relatively small bubbles, the air will be discharged with the grease and will not materially interfere with the operation of the compressor.

It is therefore one of the objects of my invention to provide a lubricant compressor having improved means for priming the pump cylinder and for preventing the formation of air pockets.

A further object of my invention is to provide an improved form of lubricant agitator, located adjacent the inlet port of the pump cylinder, and adapted to break up air pockets which may be present in the grease being pumped.

A further object is to provide an improved lubricant compressor which will be efficient in operation and which may be economically manufactured.

Other objects will appear from the following description, reference being had to the accompanying drawings, in which Fig. 1 is a side elevation of the lubricant compressor with its valve controlled discharge conduit for supplying lubricant to bearings to be lubricated;

Fig. 2 is a sectional view taken on a broken horizontal plane passing through the center line of the air motor and immediately above the pump cylinder structure;

Fig. 3 is a vertical sectional view taken on the line 3—3 of Fig. 2; and

Fig. 4 is a fragmentary sectional view taken on the line 4—4 of Fig. 2.

This application is a division of my copending application, Serial No. 686,928, filed August 26, 1933.

The lubricant compressor of the present invention is of the pneumatically operated type usable for the high pressure lubrication of machinery, particularly automobiles. It comprises generally a hopper type reservoir 10, a base 12, and a body casting 14. The reservoir 10 is closed by a cover 16 pivoted upon a hinge pin 18 which is secured to a hinge bracket 20. The cover 16 is secured in closed position by turning down the wing nut 24 threaded on a pivoted screw 26, the nut engaging a slotted angle piece 28 welded to the cover 16. A bracket 30 welded to the reservoir 10, and a rivet 32 carried by the bracket, form a pivotal support for the screw 26.

Lubricant discharged from the pump is conveyed through a flexible hose 34 which at its outer end is connected to the body 36 of a control valve. A whip end lubricant discharge hose 38 is connected to the body 36 of the control valve, and at its extremity carries a coupler 40 for making quick detachable connections with any one of a plurality of lubricant receiving fittings 42 connected to bearings 44 to be lubricated. An air control hose 46 is preferably clipped to or held adjacent the hose 34 by means of a sheath 48.

As shown in Fig. 3, the reservoir 10 is welded to the casting 14, and the latter is secured to the base 12 by means of a cap screw 50, the upper surface of the base 12 being dished so that it may be drawn tightly against the base casting.

Formed integrally with the base casting 14 is an air motor body 52 having a cylindrical bore 54 in which the piston 56 is reciprocable. The end of the cylinder 54 is closed by a head 58 threaded into the cylinder and locked in position by a tapered pin 60 (Fig. 3) which projects through one of a plurality of notches 62 formed in the flange of the head 58. A gasket 64 is interposed between the flange of the cylinder head and the end of the cylinder body. A plunger rod 66 is loosely connected to the piston 56 by an inwardly flanged sleeve 68, a head 70 formed on the end of the plunger rod 66 thus being retained, and limited lost motion between the plunger rod 66 and piston 56 permitted.

The air motor is generally similar to that shown and described in my Patent No. 1,830,643, and in my copending application Serial No. 649,765 filed January 3, 1933. It will suffice here to state that when air under pressure is supplied to the cylinder 54 through its inlet opening 72, the piston 56 will be continuously reciprocated.

The piston of the air motor is moved substantially solely by its kinetic energy during that portion of its stroke which is effective in moving the plunger through its pressure discharge stroke. The piston will thus force the plunger to eject the lubricant by hammer-like blows, making it possible to build up extremely high pressures.

The plunger rod 66 carries a plunger 74 which is reciprocable in a cylinder body 76. The body 76 is counterbored to form a seat 78 for a spring pressed ball check valve 80, and has an inlet port 82. The cylinder body 76 is held within the body 14 by a bushing 84 threaded in the body and engaging a flange 86 formed on the cylinder 76. A lock nut 88 and washer 90 prevent accidental loosening of the bushing 84, and the cylinder body 76 is held against rotation by a set screw 92 threaded in the body and having its end engaging in a notch cut in the flange 86. A T 94 is threaded in the end of the cylinder body 76 and forms a means for attaching the discharge hose 34 to the cylinder outlet. An agitator rod 96 is secured to the plunger rod 66 and is guided for longitudinal movement in a bracket 98 which is rigidly secured to a boss 100 projecting upwardly from the bottom of the casting 14 (as shown in Fig. 4), by means of a cap screw 102. The agitator rod 96 thus reciprocates with the plunger and plunger rod in a path extending over the inlet opening 82, thereby breaking up any large air bubbles which may be present in the grease.

In the use of the lubricant compressor of my invention air under pressure is supplied to the air motor cylinder 54 through a slidable air control valve which is not illustrated in detail herein, but is fully disclosed in my aforesaid application Serial No. 686,928.

Upon reciprocation of the piston 56 due to the supply of air under pressure to the cylinder 54, the piston will reciprocate the plunger stem 66 and plunger 74. It will be noted that the discharge of lubricant from high pressure cylinder 76 will take place due to the momentum imparted to the plunger 74, plunger stem 66 and piston 56, since the air pressure on the head end face of the piston 56 will be reduced to substantially atmospheric pressure at approximately the instant that the end of the plunger 74 covers the grease inlet port 82. The reciprocation of the plunger and piston is very rapid so that the lubricant will be discharged in rapid high pressure pulsations past the check valve 78 and through the discharge hose 34, past the control valve 36 and hence through the whip end hose 38 to the bearing 44 to be lubricated.

The hopper reservoir 10 is filled with grease, but frequently the grease contains pockets of entrapped air. Such pockets of air, if of sufficiently large size, greatly interfere with the operation of the high pressure pumping mechanism if and when they are present adjacent the inlet port 82 of the high pressure cylinder. If the bore of the cylinder becomes filled with air, there will be a tendency for this air merely to be compressed as the plunger moves forwardly upon a discharge stroke, and to reexpand upon the return stroke of the plunger. This is especially true if the pressure in the discharge hose 34 is relatively high, since such high pressure will prevent any of the air in the bore of the cylinder 76 from being forced past the check valve 80.

With the provision of the agitator rod 96, the grease adjacent the inlet port 82 is agitated, so that the relatively large pockets of air in the grease are broken up and reduced to such size that they will not appreciably interfere with the operation of the pumping mechanism.

While I have shown and described a preferred embodiment of my invention it will be readily understood by those skilled in the art that variations may be made in the construction disclosed without departing from the basic features of my invention. I therefore do not wish to be limited to the precise construction disclosed but wish to include within the scope of my invention all such modifications and variations which will readily suggest themselves.

What I claim as new and desire to secure by United States Letters Patent is:

1. In a high pressure grease compressor, the combination of a grease supply container, a high pressure pump cylinder positioned at the bottom of said container and having an inlet port, a pump plunger reciprocable in said cylinder, and a secondary plunger reciprocated with said pump plunger in a path closely adjacent said inlet port, said secondary plunger being of sufficiently small diameter to pierce and to break up any air bubbles which may be present in the grease adjacent said inlet port.

2. In a grease compressor, the combination of a source of grease supply, a pump cylinder having an inlet port communicating with said source, a plunger reciprocable in said cylinder, means for rapidly reciprocating said plunger, and a rod secured to said plunger for reciprocation therewith and movable in a path closely adjacent said inlet port, said rod being of smaller diameter than said plunger so as to enable it to pierce and break up any air bubbles which may be present in the grease adjacent said inlet port.

3. In a grease compressor, the combination of a source of grease supply, a pump cylinder having an inlet port communicating with said source, a plunger reciprocable in said cylinder, means for reciprocating said plunger, and a rod of relatively small diameter secured to said means and guided for reciprocation in a path closely adjacent to and extending across said inlet port thereby to prevent the formation of an air pocket adjacent said inlet port.

4. In a grease compressor, the combination of a source of grease, a pump cylinder having an inlet port communicating with said source, a plunger reciprocable in said cylinder, means for reciprocating said plunger, a rod secured to said plunger for reciprocation therewith and movable in a path closely adjacent said inlet port, and a guide for said rod located adjacent said inlet port.

5. In a grease compressor, the combination of a source of grease supply, a pump cylinder having an inlet port communicating with said source, a plunger reciprocable in said cylinder, means for reciprocating said plunger, a rod secured to said plunger for reciprocation therewith and movable in a path closely adjacent said inlet port, and a guide formed integrally with said cylinder and having a relatively close fit with said rod, whereby lubricant adhering to said rod will be scraped therefrom upon the retractile stroke thereof, and deposited adjacent said inlet port.

ERNEST W. DAVIS.